US009389391B2

(12) United States Patent
Lam

(10) Patent No.: US 9,389,391 B2
(45) Date of Patent: Jul. 12, 2016

(54) LENS DRIVING APPARATUS AND METHOD FOR MANUFACTURING THE SAME

(71) Applicant: Sunming Technologies (HK) Limited, Hong Kong (HK)

(72) Inventor: Sio Kuan Lam, Hong Kong (HK)

(73) Assignee: SUNMING TECHNOLOGIES (HK) LIMITED, Hong Kong (HK)

( * ) Notice: Subject to any disclaimer, the term of this patent is extended or adjusted under 35 U.S.C. 154(b) by 2 days.

(21) Appl. No.: 14/254,934

(22) Filed: Apr. 17, 2014

(65) Prior Publication Data

US 2015/0070790 A1    Mar. 12, 2015

Related U.S. Application Data

(60) Provisional application No. 61/876,237, filed on Sep. 11, 2013.

(51) Int. Cl.
*G02B 7/02* (2006.01)
*G02B 7/10* (2006.01)
*G02B 7/08* (2006.01)
*G02B 13/00* (2006.01)
*H02K 41/03* (2006.01)

(52) U.S. Cl.
CPC .. *G02B 7/10* (2013.01); *G02B 7/08* (2013.01); *G02B 13/001* (2013.01); *H02K 41/031* (2013.01); *Y10T 29/4902* (2015.01); *Y10T 29/49826* (2015.01)

(58) Field of Classification Search
CPC ........................................................ G02B 7/04

USPC ......................................................... 359/824
See application file for complete search history.

(56) References Cited

U.S. PATENT DOCUMENTS

| 7,400,463 | B1 | 7/2008 | Wu | |
|---|---|---|---|---|
| 7,649,703 | B2 | 1/2010 | Shiraki et al. | |
| 2011/0090580 | A1 | 4/2011 | Shiraki et al. | |
| 2011/0298971 | A1* | 12/2011 | Fan | G02B 7/08 348/374 |
| 2011/0299181 | A1 | 12/2011 | Pang et al. | |
| 2012/0008221 | A1* | 1/2012 | Min | G02B 7/04 359/824 |

FOREIGN PATENT DOCUMENTS

EP            1775615 A1       4/2007

OTHER PUBLICATIONS

Search Report of counterpart European Patent Application No. 14184448.0 issued on Jan. 23, 2015.

* cited by examiner

*Primary Examiner* — James Jones

(57) ABSTRACT

A lens driving apparatus includes a spring suspension system and an electromagnetic force generator. The spring suspension system may include a pair of leaf springs, a stationary rigid body sandwiched between the pair of springs, and a lens holder suspended by the pair of springs within a central bore of the rigid body. The electromagnetic force generator may include a coil holder holding a coil and a magnet holder holding at least one magnet. The spring suspension system and the electromagnetic force generator are connected to and spatially separated from each other by a spacer. A method for manufacturing a lens driving apparatus is also disclosed.

14 Claims, 12 Drawing Sheets

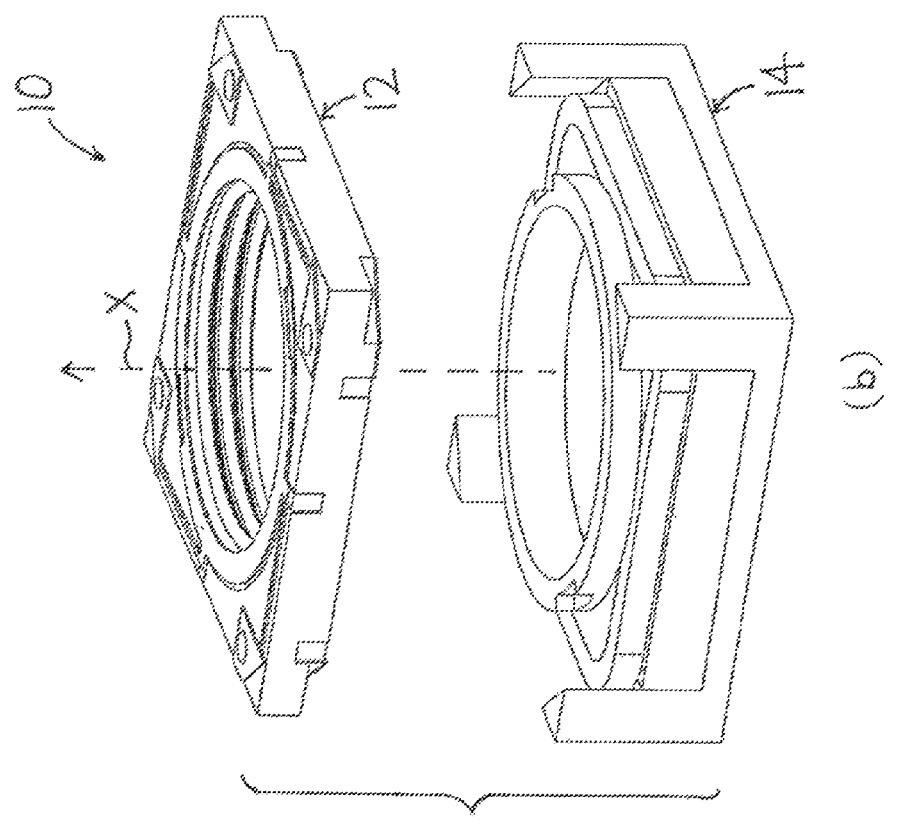
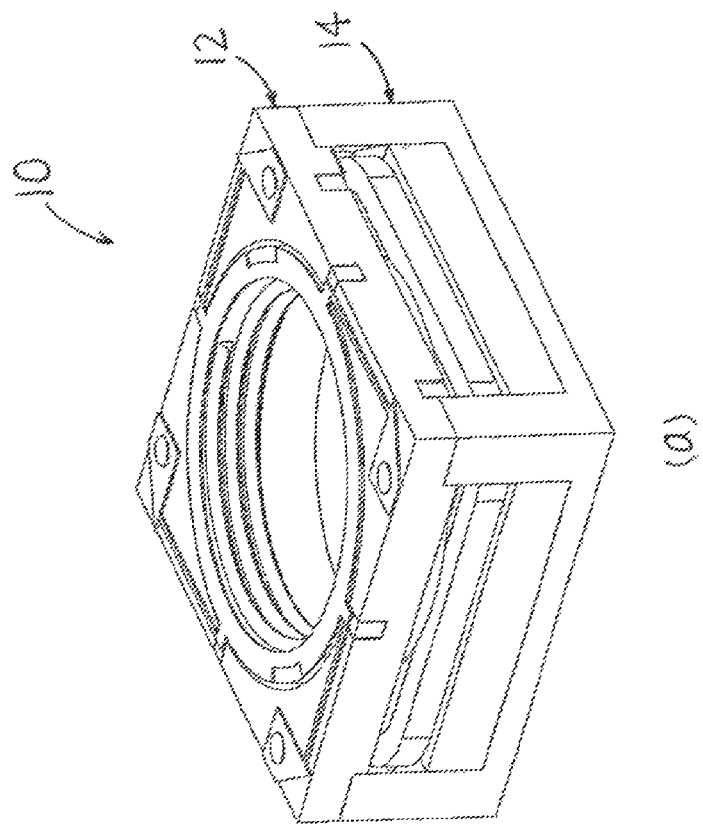
FIG. 1

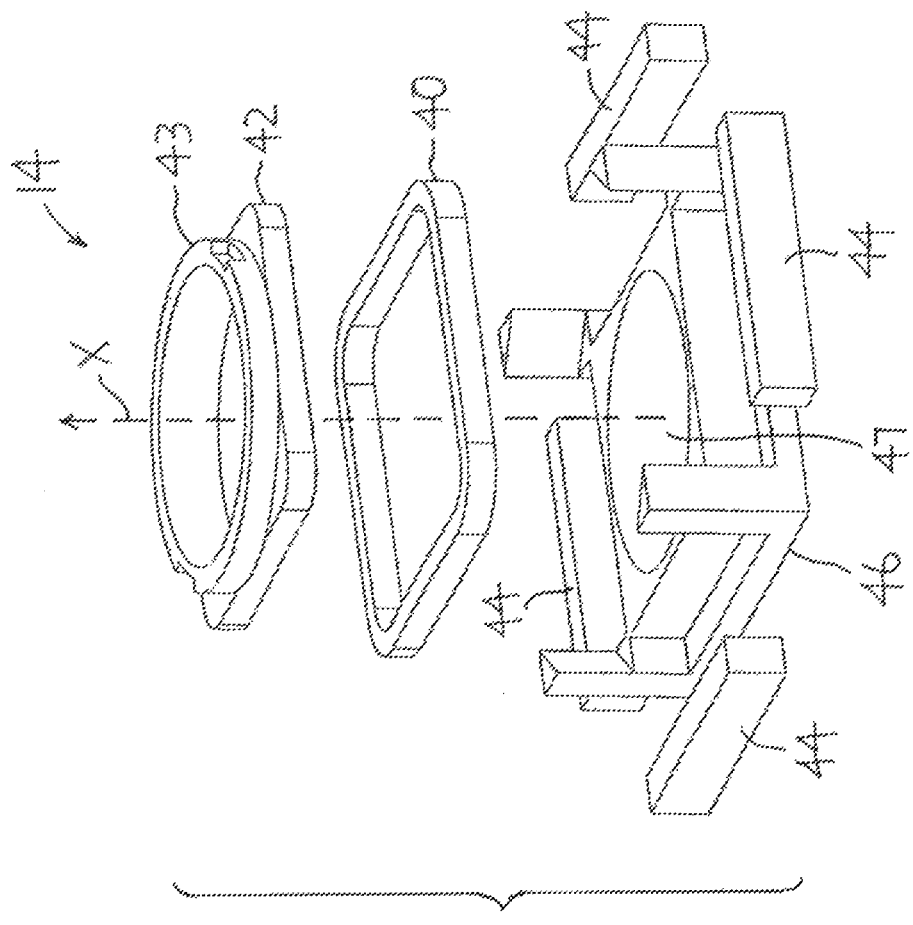
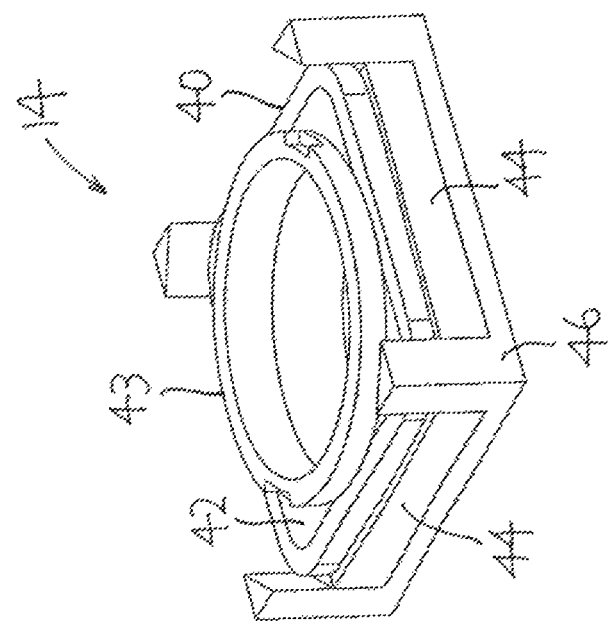
FIG. 3a

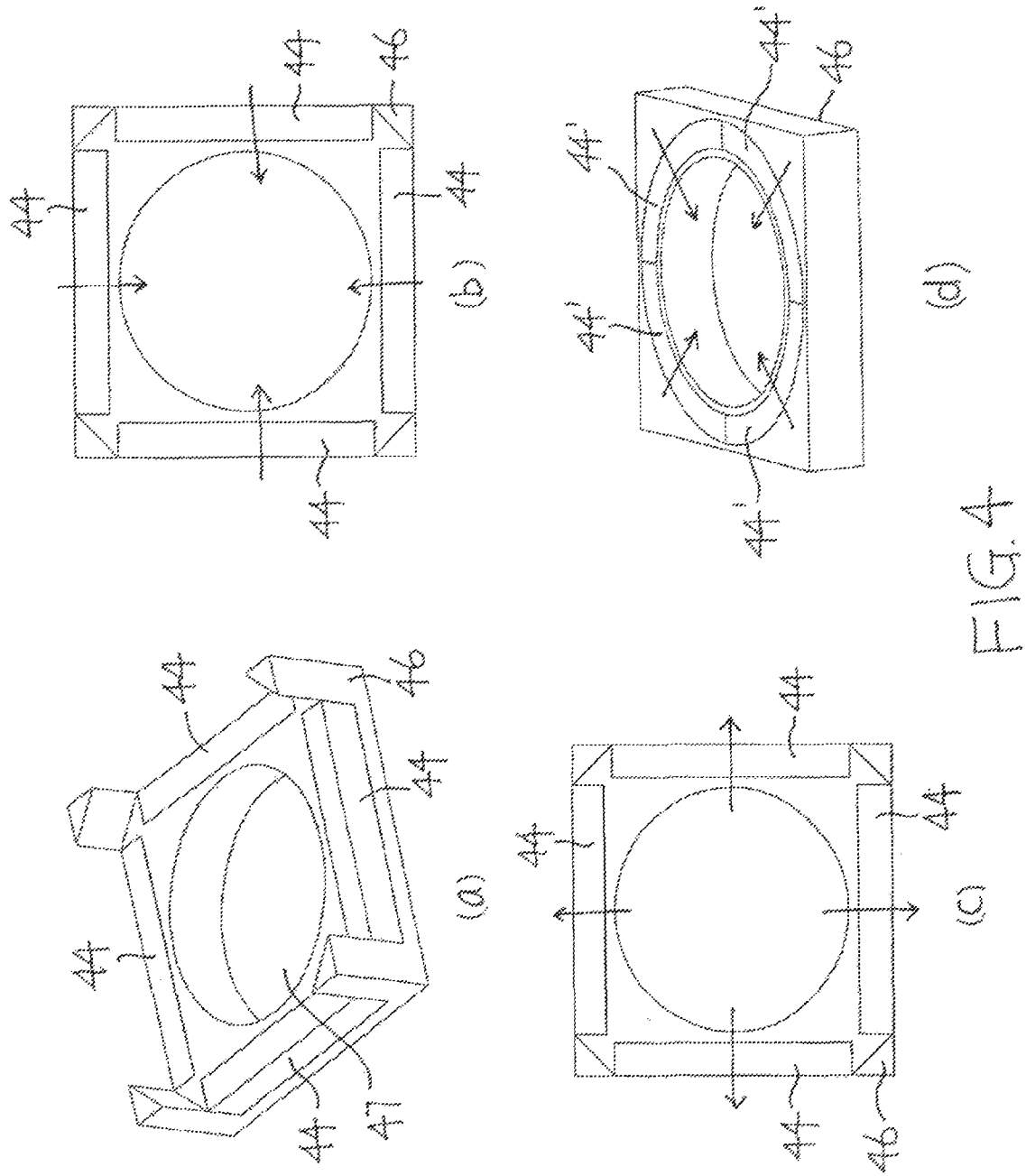

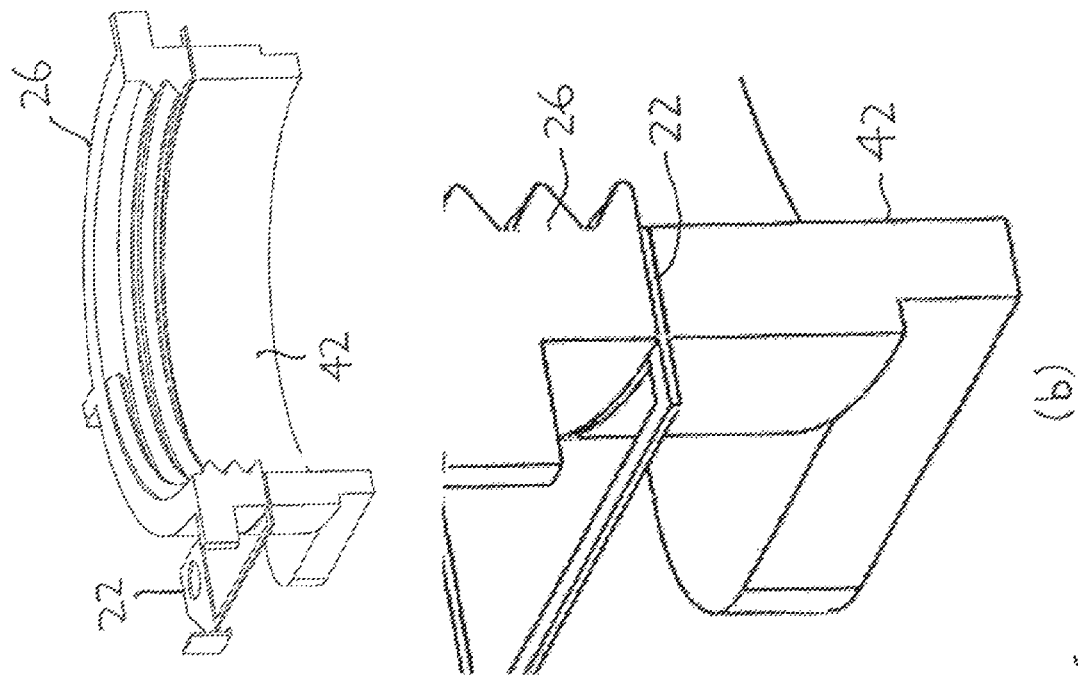
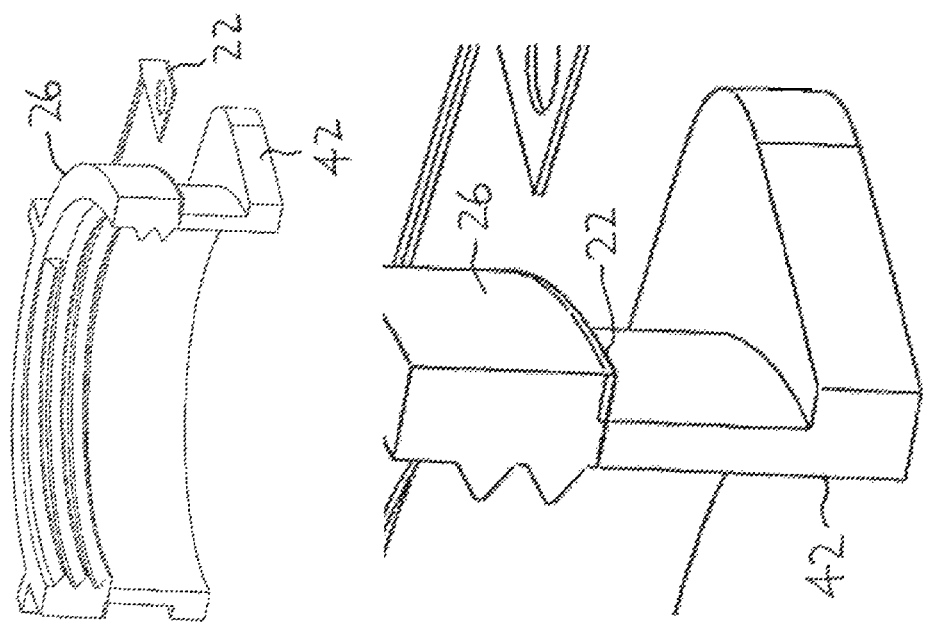
FIG. 6

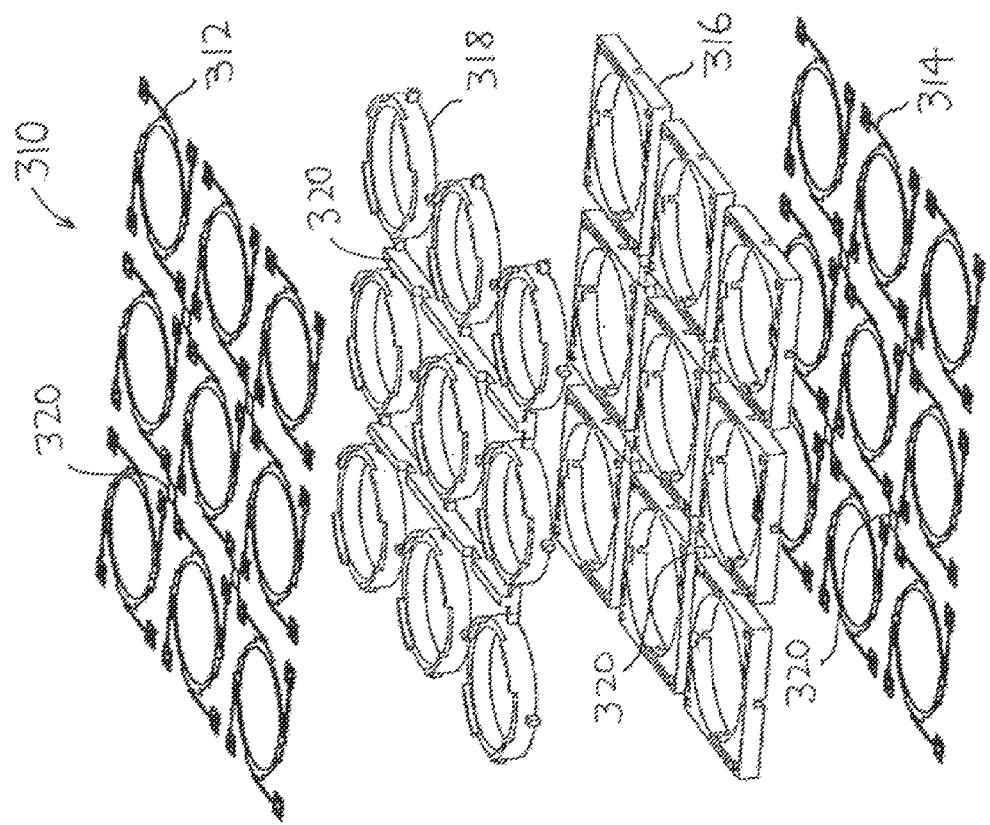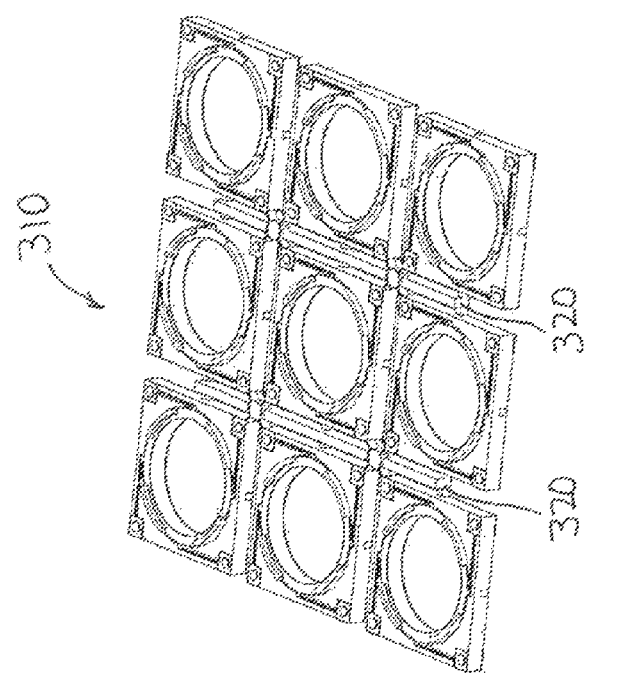
FIG. 9

LENS DRIVING APPARATUS AND METHOD FOR MANUFACTURING THE SAME

CROSS-REFERENCE TO RELATED APPLICATIONS

This application claims the benefit of U.S. Provisional Patent Application No. 61/876,237, filed Sep. 11, 2013, the entire content of which is hereby incorporated by reference.

FIELD OF THE TECHNOLOGY

The present application relates generally to a lens driving apparatus, and particularly to a lens driving apparatus having a spring suspension system and an electromagnetic force generator spatially separated from each other. The present application also relates to a method for manufacturing a lens driving apparatus

BACKGROUND

U.S. Pat. Nos. 7,649,703 and 7,400,463, and U.S. patent application US2011/0090580, disclosed a lens driving apparatus which has a pair of leaf springs. The first leaf spring is attached to the first end of the lens holder (or someone called it lens carrier, tubular lens holder, etc), while the second leaf spring is attached to the other end of the lens holder. Magnets and coil are installed spatially between these two leaf springs and surrounding the lens holder. Such structure has become the mainstream technology in the market today. However, such structure is very troublesome for assembly, and the performance of spring suspension system and electromagnetic force generator can only be measured after the complete lens driving apparatus is assembled. Therefore, if low performance of either the spring suspension system or the electromagnetic force generator will cause entire failure of the lens driving apparatus, and thus lead to a substantial loss of raw materials.

Furthermore, such structure is normally assembled individually and this leads to a higher portion of the labor cost in the cost structure of such a lens driving apparatus. Recently, U.S. patent application US2011/0299181 disclosed a novel concept of a lens driving apparatus, which is composed of components which are made in planar form, such as coil, magnets, spring, etc. The whole lens driving apparatus can be assembled by laminating all planar type components one on top of the others. Furthermore, it further disclosed that such planar form components can be panelized so that the laminating assembly process becomes batch processing, and many lens driving apparatuses can be assembled all together at one time on the same panel. This laminating process will help to reduce labor cost significantly.

However, the disclosed laminating structure is directly applied to lens assembly unit, not lens holder. Therefore, every different lens assembly unit (for example, lens assembly units from different lens companies) has to have its corresponding tailor design of laminating lens driving apparatus. This will increase the difficulty of adoption of such lens driving apparatus in the market. Furthermore, the US patent application US2011/0299181 did not disclose the panelized component structure design and components panels.

The above description of the background is provided to aid in understanding the lens driving apparatus, but is not admitted to describe or constitute pertinent prior art to the lens driving apparatus, or consider the cited documents as material to the patentability of the claims of the present application.

SUMMARY

According to one aspect, there is provided a lens driving apparatus including a spring suspension system and an electromagnetic force generator. The spring suspension system may include a pair of leaf springs, a stationary rigid body sandwiched between the pair of leaf springs, and a lens holder suspended by the pair of leaf springs within a central bore of the rigid body. The electromagnetic force generator may include a coil holder holding a coil and a magnet holder holding at least one magnet. The spring suspension system and the electromagnetic force generator are connected with and spatially separated from each other by a spacer.

According to some embodiments, the spacer may include a plurality of upright columns formed on the electromagnetic force generator. The spacer may include four upright columns integrally formed at four corners of the magnet holder respectively. The spacer may include four upright columns mounted at four corners of the magnet holder respectively, each column being comprised of a stack of spacing members. The spacer may include two upright columns formed on the coil holder.

In one embodiment, the spacer can be in the form of a yoke provided on the electromagnetic force generator. The yoke can be a rectangular yoke having four vertical walls provided on four peripheral sides of the magnet holder. The spacer may include a magnetic material.

In one embodiment, the stationary rigid body of the spring suspension system can be in direct contact with the magnet holder of the electromagnetic force generator. In another embodiment, the stationary rigid body of the spring suspension system can be indirectly connected with the magnet holder of the electromagnetic force generator through one of the leaf springs.

In one embodiment, the lens holder of the spring suspension system can be in direct contact with the coil holder of the electromagnetic force generator. In another embodiment, the lens holder of the spring suspension system can be indirectly connected with the coil holder of the electromagnetic force generator through one of the leaf springs.

In one embodiment, at least one of the leaf springs may include a plurality of spring members disposed in a plane perpendicular to an optical axis. The spring members may have respective inner portions disposed circumferentially around the lens holder and respective outer portions extending outwardly therefrom.

According to another aspect, there is provided an electronic image-capturing device having a lens driving apparatus which includes a spring suspension system and an electromagnetic force generator. The spring suspension system may include a pair of leaf springs, a stationary rigid body sandwiched between the pair of leaf springs, and a lens holder suspended by the pair of leaf springs within a central bore of the rigid body. The electromagnetic force generator may include a coil holder holding a coil and a magnet holder holding at least one magnet. The spring suspension system and the electromagnetic force generator are connected with and spatially separated from each other by a spacer.

According to yet another aspect, one can form a lens driving apparatus by stacking all the component panels together without forming a spring suspension system and an electromagnetic force generator panel. Such method may include (a) separately forming a panel for each component by connecting a plurality of each of the components together by a plurality of bridges; (b) stacking the separately formed panels for each component one on top of the other to thereby form a panel of lens driving apparatus; and (c) cutting away the bridges of the panels of each component to form a plurality of separated individual lens driving apparatus. Thus, a number of individual lens driving apparatus are obtained at the same time. The components and the bridges may be made of different materials.

According to one embodiment, the step of separately forming the lens driving apparatus may include (i) separately forming a panel of spring suspension systems connected to one another by a plurality of first bridges, each spring suspension system may include a pair of leaf springs, a stationary rigid body sandwiched between the pair of leaf springs, and a lens holder suspended by the pair of leaf springs within a central bore of the rigid body; (ii) separately forming a panel of electromagnetic force generators connected to one another by a plurality of second bridges, each electromagnetic force generator may include a coil holder holding a coil and a magnet holder holding at least one magnet; (iii) stacking the panel of spring suspension systems and the panel of electromagnetic force generators together by a single-directional vertical assembly process; and (iv) cutting the plurality of first and second bridges to produce a plurality of lens driving apparatuses, wherein the spring suspension system and the electromagnetic force generator are connected to and spatially separated from each other by a spacer.

In one embodiment, the step of separately forming the panel of spring suspension systems may include (i) forming a panel of first leaf springs connected to one another by a plurality of third bridges; (ii) forming a panel of rigid bodies connected to one another by a plurality of fourth bridges; (iii) forming a panel of lens holders connected to one another by a plurality of fifth bridges; (iv) forming a panel of second leaf springs connected to one another by a plurality of sixth bridges; and (v) stacking the panels of first leaf springs, rigid bodies, lens holders and second leaf springs one on top of the other by a single-directional vertical assembly process to thereby form the panel of spring suspension systems.

In one embodiment, the step of separately forming the panel of electromagnetic force generators may include (i) forming a panel of coil holders connected to one another by a plurality of seventh bridges with a coil on each coil holder; (ii) forming a panel of magnet holders connected to one another by a plurality of eighth bridges with at least one magnet on each magnet holder; and (iii) stacking the panel of coil holders and the panel of magnet holders together by a single-directional vertical assembly process to thereby form the panel of electromagnetic force generators.

In one embodiment, the bridges of component panels may be made of a material different from the materials of the components.

Although the lens driving apparatus is shown and described with respect to certain embodiments, it is obvious that equivalents and modifications will occur to others skilled in the art upon the reading and understanding of the specification. The lens driving apparatus in the present application includes all such equivalents and modifications, and is limited only by the scope of the claims.

BRIEF DESCRIPTION OF THE DRAWINGS

Specific embodiments of the lens driving apparatus will now be described by way of example with reference to the accompanying drawings wherein:

FIGS. 1(a) and 1(b) are perspective and exploded views respectively of a lens driving apparatus according to an embodiment of the application;

FIG. 3a shows different views of an electromagnetic force generator of the lens driving apparatus according to an embodiment of the application;

FIGS. 4(a)-4(d) show the magnetization direction of different embodiments of magnet and magnet holder of the electromagnetic force generator;

FIGS. 6(a) and 6(b) show direct and indirect connection of a lens holder to a coil holder respectively;

FIGS. 9(a) and 9(b) are perspective and exploded views respectively of a panel of spring suspension systems according to an embodiment of the application.

DETAILED DESCRIPTION

Figure 2:
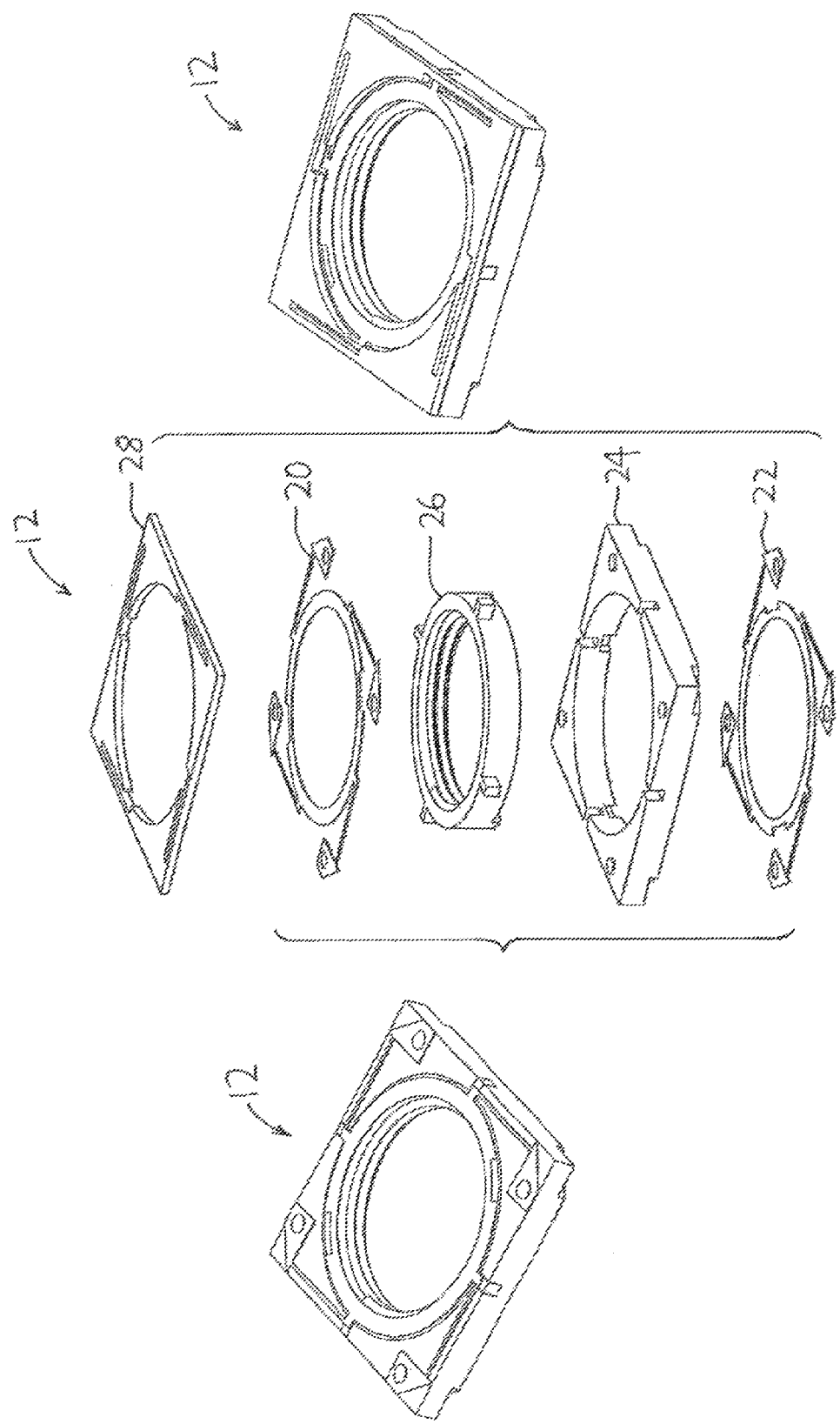
FIG. 2 shows different views of a spring suspension system of the lens driving apparatus according to an embodiment of the application.

In the following detailed description, numerous specific details are set forth to provide a thorough understanding of claimed subject matter. However, it will be understood by those skilled in the art that claimed subject matter may be practiced without these specific. In other instances, methods, apparatuses, or systems that would be known by one of ordinary skill have not been described in detail so as not to obscure claimed subject matter.

Reference throughout this specification to "one embodiment" or an embodiment" may mean that a particular feature, structure, or characteristic described in connection with a particularly embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and", "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics.

Though, it should be noted that this is merely an illustrative example and claimed subject matter is not limited to this example.

As used to describe such embodiments, terms "above", "below", "upper", "lower", and "side" describes positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is under stood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

It should be understood that the present application is not limited to the preferred embodiments described herein below and, needless to say, a variety of modifications or variations may be made without departing from the scope of the protection defined herein.

FIGS. 1a and 1b show different views of a lens driving apparatus according to an embodiment. The lens driving apparatus 10 may include a spring suspension system (SSS) 12 and an electromagnetic force generator (EFG) 14. In some embodiments, an outer casing and a plurality of electrodes may be provided. The spring suspension system 12 can be mounted on top of the electromagnetic force generator 14 and vice versa.

According to an embodiment, FIG. 2 shows an exploded perspective view of the spring suspension system 12. The spring suspension system 12 may include a pair of leaf springs 20, 22, a stationary or fixed rigid body 24 sandwiched between the pair of leaf springs 20, 22, and a lens holder 26 suspended by the pair of leaf springs 20, 22 within a central bore of the rigid body 24.

In some other embodiments, the spring suspension system 12 may further include a top cover 28 to protect the leaf spring 20 during the course of lens movement. The fixed rigid body 24 can be a mechanical part which can be fixed spatially and provide mechanical support to the leaf springs 20, 22. The fixed rigid body 24 may include a central bore or a cylindrical hollow portion at the center with a central axis aligns with an optical axis X or the lens moving direction. The lens holder 26 may have a substantially tubular shape with a small thickness, which can be substantially equal to the thickness of the fixed rigid body 24. In some embodiments, the lens holder 26 may also have a rectangular shape or other shapes which fit the central bore or hollow portion of the rigid body. The hollow portion of the lens holder 26 can be used to hold a lens assembly unit thereon. Each leaf spring 20, 22 may include an outer portion 30, an inner portion 32, and a connection arm 34 extending between the outer portion 30 and inner portion 32. The outer portions 30 of the leaf springs 20, 22 can be connected to the fixed rigid body 24 and can be firmly fixed on rigid body 24 during the course of lens movement. The inner portions 32 of the springs 20, 22 may be substantially in circular form which is matching with two end facets of the tubular lens holder 26. In some embodiments, the inner portions 32 of the spring 20, 22 may be in a shape which fit with the two end facets of the lens holder 26. The connection arms 34 can deform when the lens holder 26 moves along the optical axis X, and thus generate an elastic force against the lens holder 26 movement. This elastic force can also act as a restoring force and drive the lens holder 26 (and thus the lens assembly unit) to return to a rest position.

In a preferable embodiment of the present application, both top and bottom leaf springs 20, 22 may have identical key mechanical structure responsible for generating elastic force. In another embodiment, such key mechanical structure responsible for generating elastic force could be different for the top and bottom leaf spring 20, 22 respectively.

Figure 2A:
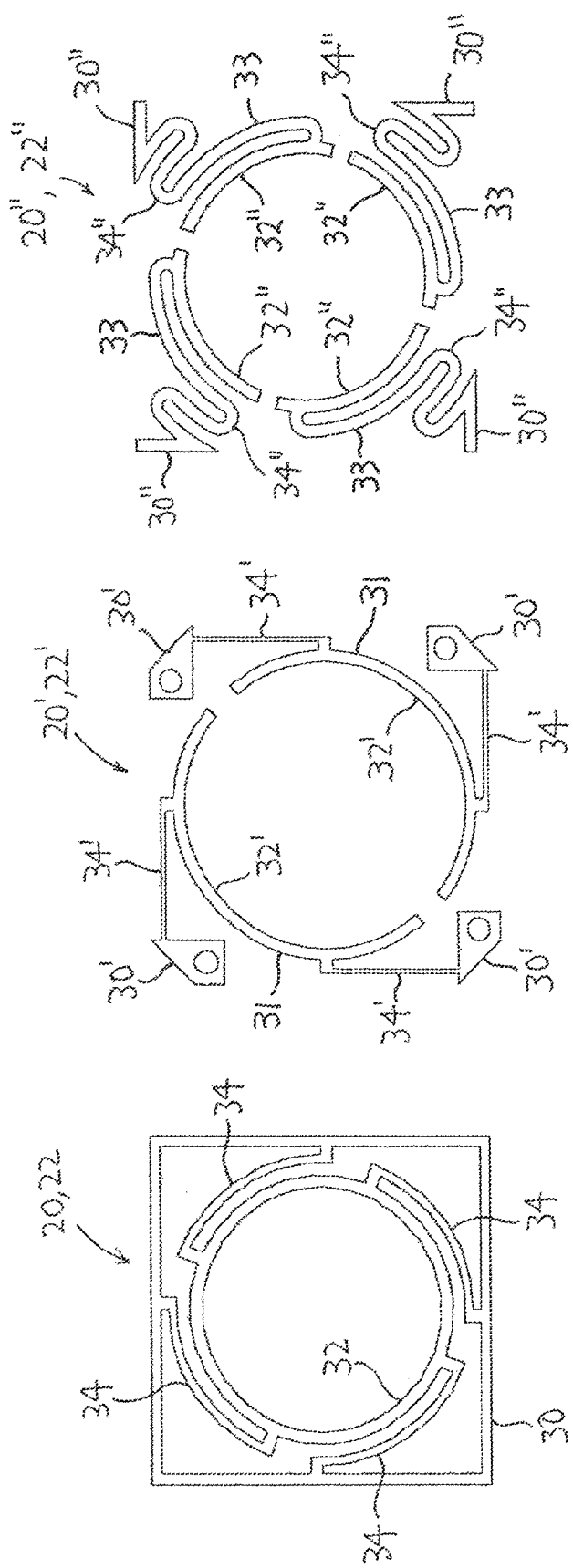
FIG. 2a shows some embodiments of a spring leaf of the spring suspension system.

In some other embodiments (FIG. 2a), the leaf spring 20, 22 may include one or more sections, wherein each section can also be a leaf spring. Each leaf spring 20, 22 may also include one or more outer portions 30, 30', 30" which can be connected to the fixed rigid body 24 and can be firmly fixed on rigid body 24 during the course of lens movement. Each leaf spring 20, 22 may include one or more inner portions 32, 32', 32" which can be firmly fixed on the two ends of the lens holder 26. The inner portions 32, 32', 32" of the springs 20, 22 may be substantially in circular form which matches with the two end facets of the tubular lens holder 26. The connection arms 34, 34', 34" of the spring 20, 22 can have different structures and can be the main deformation areas which produce the elastic force.

Figure 3B:
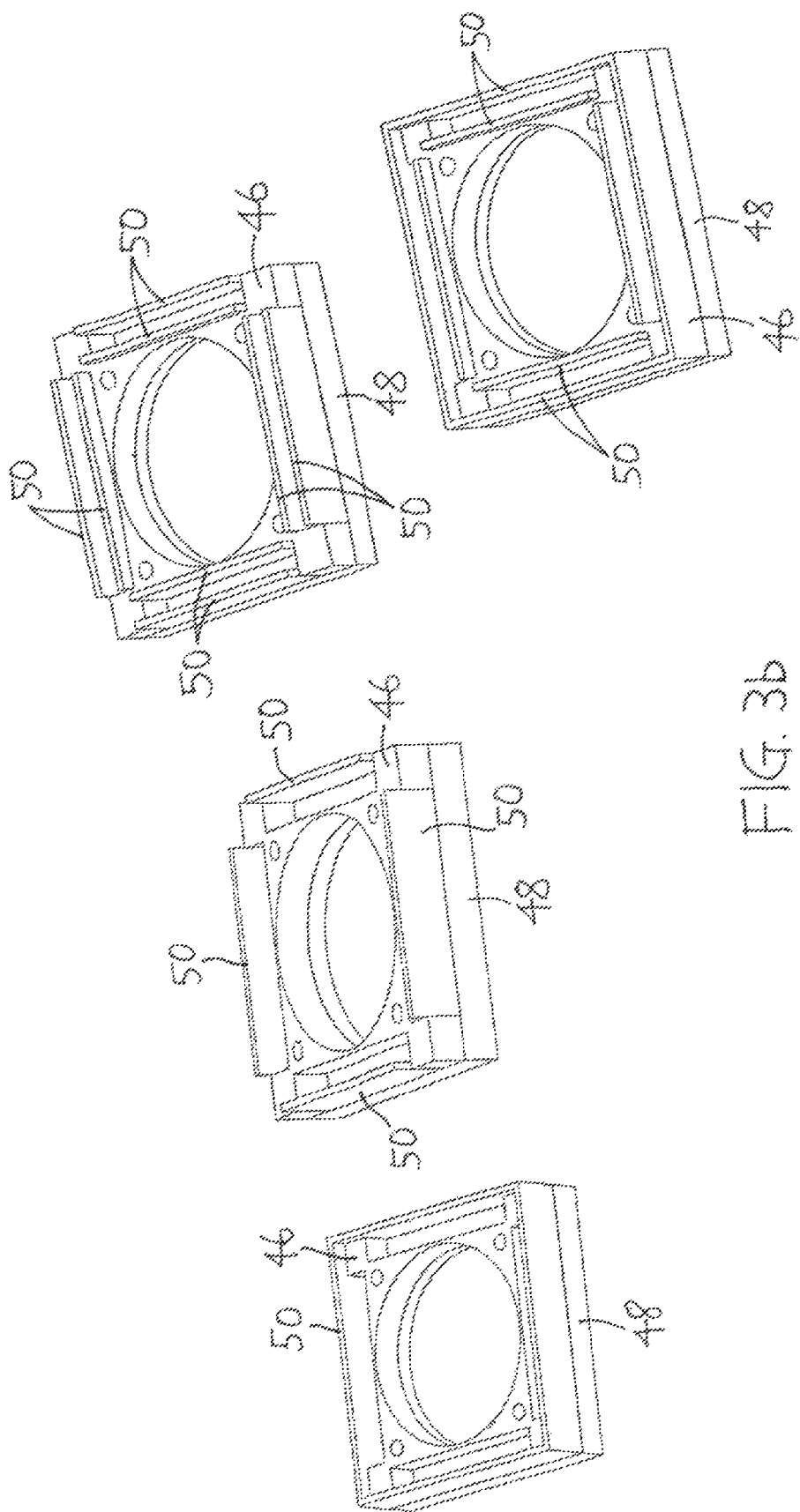
FIG. 3b shows some embodiments of a magnet holder of the electromagnetic force generator.

FIG. 3a shows an exploded perspective view of an electromagnetic force generator 14 according to an embodiment. The electromagnetic force generator 14 may include a coil 40, a coil holder 42, at least one magnet 44, and a magnet holder 46. The center of the magnet holder 46 may have a tubular hole 47 which may have its central axis aligns with the optical axis X. A tubular part 43 of the coil holder 42 may extend into this hole 47 and move along the central axis in some embodiments. Lens assembly unit may also extend into this hole 47 and move along the central/optical axis in another embodiment.

As depicted in FIGS. 4a-4d, the magnets 44 may be allocated on the peripheral areas of the magnet holder 46 around the hole 47. The magnetization directions of the magnets 44 can be substantially arranged in the same plane which can be perpendicular to the optical axis X and the central axis of the tubular hole of the magnet holder 46. The magnetization direction of the magnets 44 can also be arranged in the way of pointing inwards or outwards all together as shown in FIGS. 4b and 4c. FIG. 4d shows another embodiment of the magnets 44' and respective magnet holder 46. For such magnet structure, a ring-shaped coil should be used and the coil holder 42 should have respective change to hold the ring-shaped coil.

In another embodiment (FIG. 3b), the magnet holder 46 and a base 48 can be integrated into a single unit with all the necessary features. In other embodiments, the magnet holder 46 may also contain at least a yoke 50 which can be used to confine the magnetic field or flux and improve the electromagnetic force. The yoke 50 may be made of a magnetic conductive material. In another embodiment, a casing can become the yoke 50 of the magnet holder 46.

The SSS 12 and the EFG 14 can be connected to each other via two portions. The first portion may be the connection of the fixed rigid body 24 of SSS 12 to the magnet holder 46 of EFG 14. The second portion may be the connection of the lens holder 26 of SSS 12 to the coil holder 42 of EFG 14 or the moving part of the EFG 14. All connections can be either direct connection, or indirect connection which connects two parts via a third component.

Figure 5:
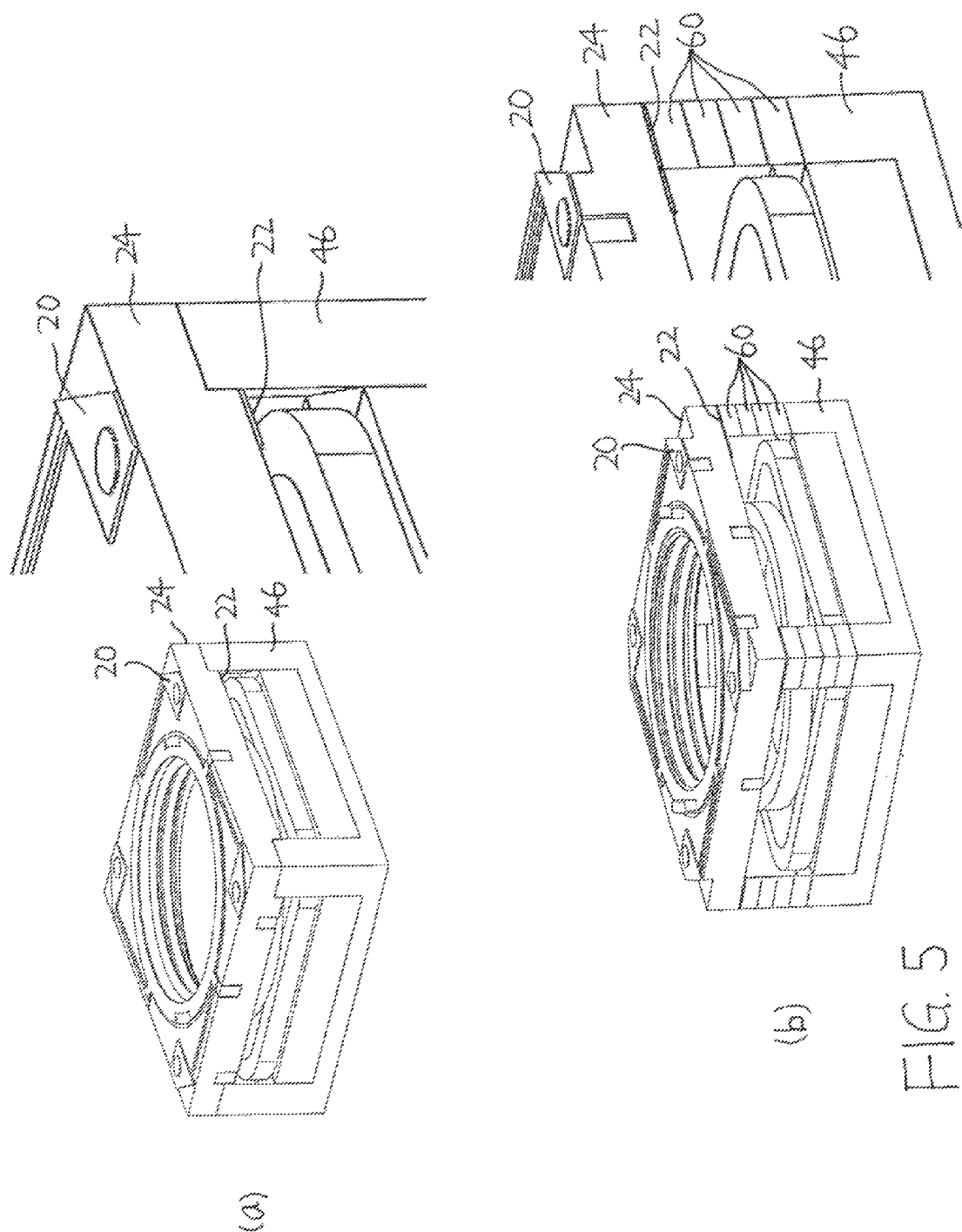
FIGS. 5(a) and 5(b) show direct and indirect connection of a stationary rigid body to a magnet holder respectively.

FIGS. 5a and 5b show perspective views of direct and indirect connections of a fixed portion of the fixed rigid body 24 of SSS 12 to the magnet holder 46 of EFG 14 respectively. In FIG. 5b, there are four pieces of spacers 60 which may be used for connecting the rigid body 24 to the magnet holder 46. In some embodiments, only one piece of spacer can be used. In other embodiments, some spacers 60 may have a complex structure and connect to the magnet holder 46 from the peripheral area thereof. In some other embodiments, the spacers 60 can be made of a magnetic material. The magnetic material refers to those materials which can re-direct and confine the spatial distribution of magnetic flux.

As used herein, the term "spacer" means a piece of material or a structure that is used to create and maintain a space between two things. FIGS. 6a and 6b show perspective views of direct and indirect connections of the lens holder 26 and coil holder 42. As shown in FIG. 6a, the lens holder 26 may be directly connected to the coil holder 42. The leaf spring 22 may be disposed on a bottom surface of the lens holder 26 extending outwardly from the coil holder 42. As shown in FIG. 6b, the lens holder 26 may be indirectly connected with the coil holder 42 through the leaf springs 22. In this illustrated embodiment, the leaf spring 22 can be fixed between a bottom surface of the lens holder 26 and a top surface of the coil holder 42.

Figure 7:
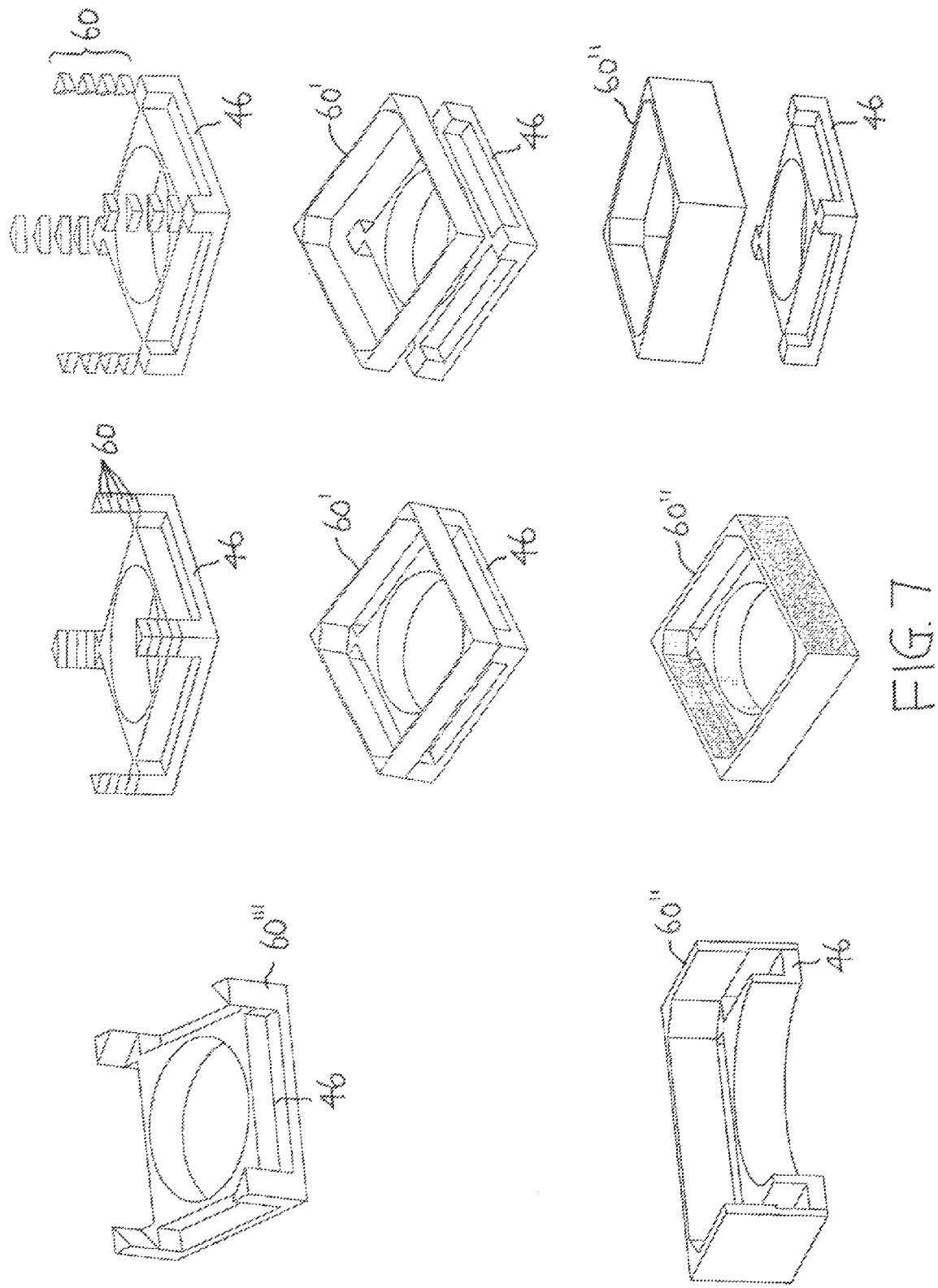
FIG. 7 shows some embodiments of a spacer between the spring suspension system and the electromagnetic force generator.

FIG. 7 shows some of the embodiments of the spacers 60 provided on the magnet holder 46. The spacer 60 may include a plurality of upright columns formed on the electromagnetic force generator. Each column may include of a stack of spacing members. The spacers 60' may be integrally formed on the magnet holder 46. In other embodiments, the spacers 60', 60" may be in the form of a rectangular yoke provided on magnet holder 47.

Although it has been shown and described that the spacers 60, 60', 60", 60'" are provided on the magnet holder 46, it is understood that the spacers can be provided on the coil holder, or on the SSS 12, such as the rigid body 24.

Figure 8:
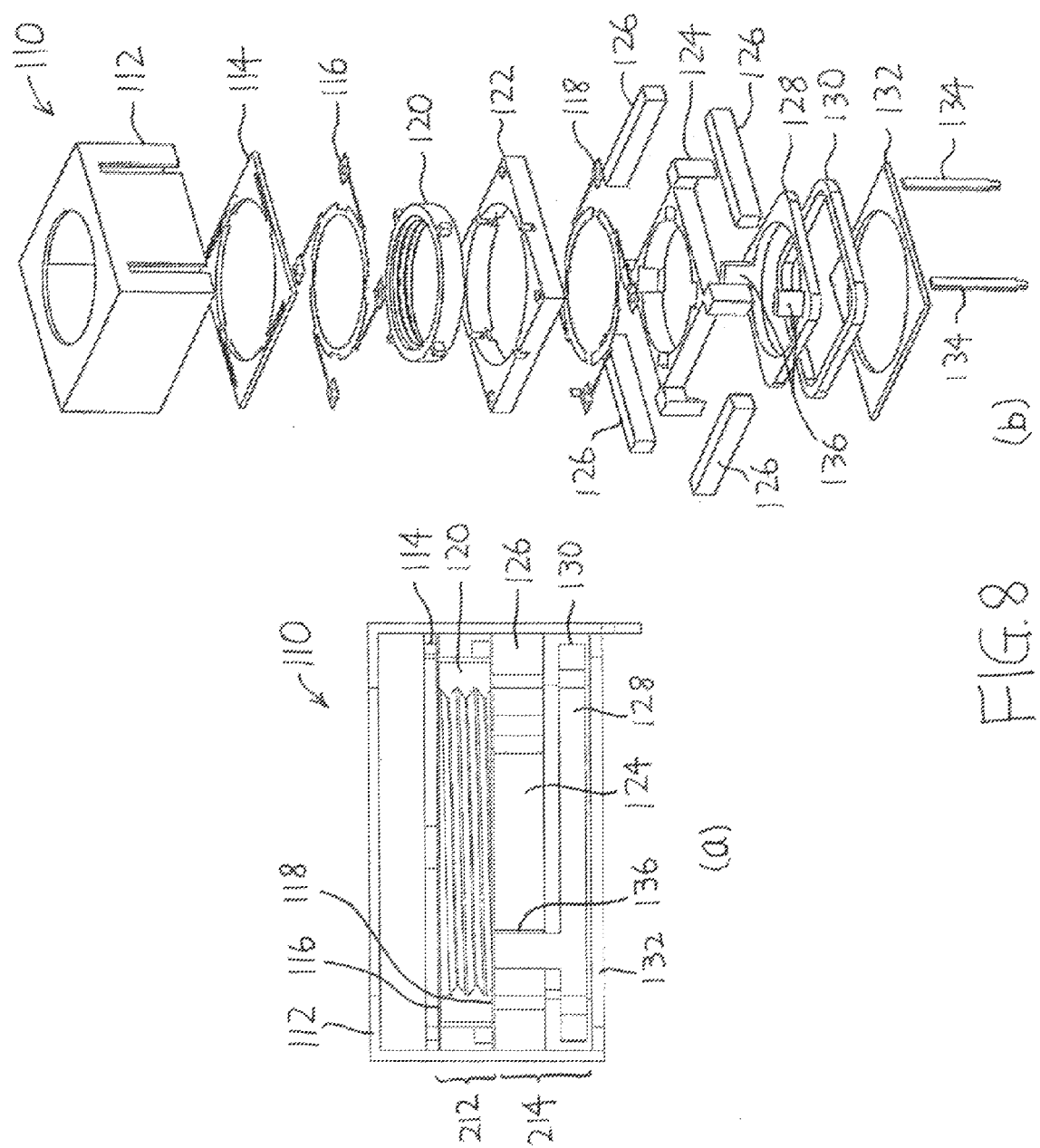
FIGS. 8(a) and 8(b) are cross sectional and exploded views respectively of a lens driving apparatus according to another embodiment of the application.

FIGS. 8a and 8b show different views of another embodiment of the lens driving apparatus 110. The lens driving apparatus 110 may include a casing 112, a top cover 114, a pair of leaf springs 116, 118, a lens holder 120, a stationary rigid body 122, a magnet holder 124, a plurality of magnets 126, a coil holder 128, a coil 130, a bottom cover 132 and two electrodes 134. In this embodiment, the magnet holder 124 can be allocated between the SSS 212 and coil holder 128 of the EFG 214. In this embodiment, there is another implementation of coil holder 128, which has no tubular part. Instead, two upright columns 136 may be projecting out of the coil holder 42. The two upright columns 136 can pass through the magnet holder 124 and can directly or indirectly connect to the lens holder 120 of SSS 212. In this embodiment, the casing 112 can be used to provide general protection to the lens driving apparatus 110. In some other embodiments, the casing 112 can also be used as a yoke to confine the magnetic flux and enhance the EFG efficiency.

The lens driving apparatus 10, 110 disclosed in the present application can be incorporated into any image-capturing electronic devices such as cameras, video recorders, and mobile phones, etc.

Advantages of the lens driving apparatus of the present application is to separate the SSS 212 and EFG 214 spatially to improve the manufacturing yield rate and reduce the waste of material and thus reduce material cost because independent quality testing or monitoring can be performed on SSS and EFG respectively. Matching of a good quality SSS with a good quality EFG can be done on the manufacturing process. Another advantage is its planar component structure, which simplify the assembly process from complex 3D assembly process into a single directional vertical assembly process. Thus, it is possible to combine many same components into one panel and laminate all the different components panels together to form the lens driving apparatus 10 in a batch processing manner. As used herein, the term "component panel" or "a panel of components" means a plurality/array of components lying on a plane in the form of a flat and thin panel-like structure.

Figure 10:
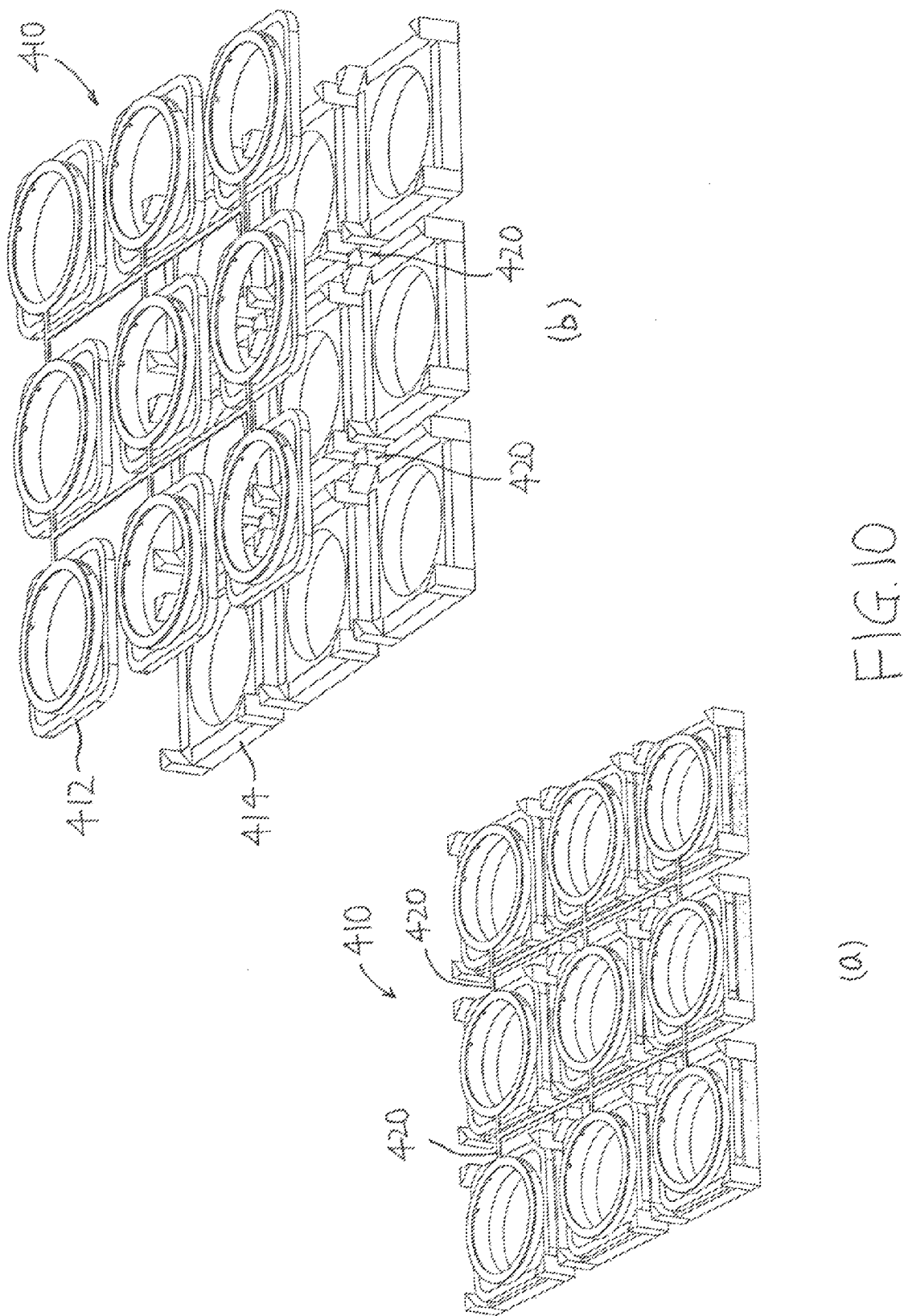
FIGS. 10(a) and 10(b) are perspective and exploded views respectively of a panel of electromagnetic force generators according to an embodiment of the application.

FIGS. 9 and 10 show perspective views of the spring suspension system panel 310 and EFG panel 410 according to an embodiment. The SSS panel 310 may further include two leaf springs panels 312, 314, one fixed rigid body panel 316, and one lens holder panel 318. As shown in FIG. 9, all panels can include a plurality of repeating component units, such as spring 20, 22, fixed rigid body 24, or lens holder 26, and bridge portions 320 connecting at least two repeating component units together. The bridges 320 can be made by the same material as the repeating components which can be connected by the bridges 320. The bridges 320 can also be made by material different from that of the repeating components which are connected by the bridges 320. SSS unit can be assembled by laminating or stacking the respective panels 312, 314, 316, 318 altogether. For EFG panel 410, the coil holder and magnet holder can also have their respective panel forms 412, 414. All the description to the SSS panel can also apply to the EFG panel and its component panels. During the lens assemble process, the component panels will be laminated one by one. After all the panels are all laminated together, a single lens driving apparatus 10 can be obtained by cutting the assembled panels unit along the bridge or joint spot.

To manufacture the lens driving apparatus, one may first separately forms the panel of spring suspension systems 310 connected to one another by the bridges 320. Each spring suspension system 310 may include a pair of leaf springs, a stationary rigid body sandwiched between the pair of leaf springs, and a lens holder suspended by the pair of leaf springs within a central bore of the rigid body.

Then, one may separately forms the panel of electromagnetic force generators 410 connected to one another by the bridges 420. Each electromagnetic force generator 410 may include a coil holder holding a coil and a magnet holder holding at least one magnet.

Thereafter, one can stack the panel of spring suspension systems 310 and the panel of electromagnetic force generators 410 together by a single-directional vertical assembly process.

Finally, one can cut the bridges 320, 420 to produce a plurality of lens driving apparatuses, wherein the spring suspension system and the electromagnetic force generator are connected to and spatially separated from each other by a spacer.

The step of separately forming the panel of spring suspension systems 310 may include the steps of (a) forming the panel of first leaf springs 312 connected to one another by bridges; (b) forming the panel of rigid bodies 316 connected to one another by bridges; (c) forming the panel of lens holders 314 connected to one another by bridges; (d) forming the panel of second leaf springs connected to one another by bridges; and (e) stacking the panels of first leaf springs, rigid bodies, lens holders and second leaf springs one on top of the other by a single-directional vertical assembly process to thereby form the panel of spring suspension systems 310.

The step of separately forming the panel of electromagnetic force generators 410 may include (a) forming the panel of coil holders 410 connected to one another by bridges with a coil on each coil holder; (b) forming the panel of magnet holders 414 connected to one another by bridges with at least one magnet on each magnet holder; and (c) stacking the panel of coil holders 412 and the panel of magnet holders 414 together by a single-directional vertical assembly process to thereby form the panel of electromagnetic force generators 410.

According to yet another aspect of this method, one can form a lens driving apparatus by stacking all the component panels together without forming a spring suspension system and an electromagnetic force generator panel. Such method may include (a) separately forming a panel for each component by connecting a plurality of each of the components together by a plurality of bridges; (b) stacking the separately formed panels for each component one on top of the other to thereby form a panel of lens driving apparatus; and (c) cutting away the bridges of the panels of each component to form a plurality of separated individual lens driving apparatus. Thus, a number of individual lens driving apparatus are obtained at the same time. The components and the bridges may be made of different materials.

While there has been illustrated and described what are presently considered to be example embodiments, it will be understood by those skilled in the art that various other modifications may be made, and equivalents may be substituted, without departing from the central concept described herein. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A lens driving apparatus comprising:
    (a) a spring suspension system comprising a pair of leaf springs, a stationary rigid body sandwiched between the pair of leaf springs, and a lens holder suspended by the pair of leaf springs within a central bore of the rigid body; and
    (b) an electromagnetic force generator comprising a coil holder holding a coil and a magnet holder holding at least one magnet;
    (c) wherein the spring suspension system and the electromagnetic force generator are connected with and spatially separated from each other by a spacer.

2. The lens driving apparatus as claimed in claim 1, wherein the spacer comprises a plurality of upright columns formed on the electromagnetic force generator.

3. The lens driving apparatus as claimed in claim 1, wherein the spacer comprises four upright columns integrally formed at four corners of the magnet holder respectively.

4. The lens driving apparatus as claimed in claim 1, wherein the spacer comprises four upright columns mounted at four corners of the magnet holder respectively, each column being comprised of a stack of spacing members.

5. The lens driving apparatus as claimed in claim 1, wherein the spacer comprises two upright columns formed on the coil holder.

6. The lens driving apparatus as claimed in claim 1, wherein the spacer is in the form of a yoke provided on the electromagnetic force generator.

7. The lens driving apparatus as claimed in claim 1, wherein the spacer is in the form of a rectangular yoke having four vertical walls provided on four peripheral sides of the magnet holder.

8. The lens driving apparatus as claimed in claim 1, wherein the spacer comprises a magnetic material.

9. The lens driving apparatus as claimed in claim 1, wherein the stationary rigid body of the spring suspension system is in direct contact with the magnet holder of the electromagnetic force generator.

10. The lens driving apparatus as claimed in claim 1, wherein the stationary rigid body of the spring suspension system is indirectly connected with the magnet holder of the electromagnetic force generator through one of the leaf springs.

11. The lens driving apparatus as claimed in claim 1, wherein the lens holder of the spring suspension system is in direct contact with the coil holder of the electromagnetic force generator.

12. The lens driving apparatus as claimed in claim 1, wherein the lens holder of the spring suspension system is indirectly connected with the coil holder of the electromagnetic force generator through one of the leaf springs.

13. The lens driving apparatus as claimed in claim 1, wherein at least one of the leaf springs comprises a plurality of spring members disposed in a plane perpendicular to an optical axis, and wherein the spring members have respective inner portions disposed circumferentially around the lens holder and respective outer portions extending outwardly therefrom.

14. An electronic image-capturing device comprising a lens driving apparatus claimed in claim 1.

* * * * *